G. A. STEINLE.
GEARING.
APPLICATION FILED JAN. 11, 1908.
934,105.
Patented Sept. 14, 1909.
3 SHEETS—SHEET 3.
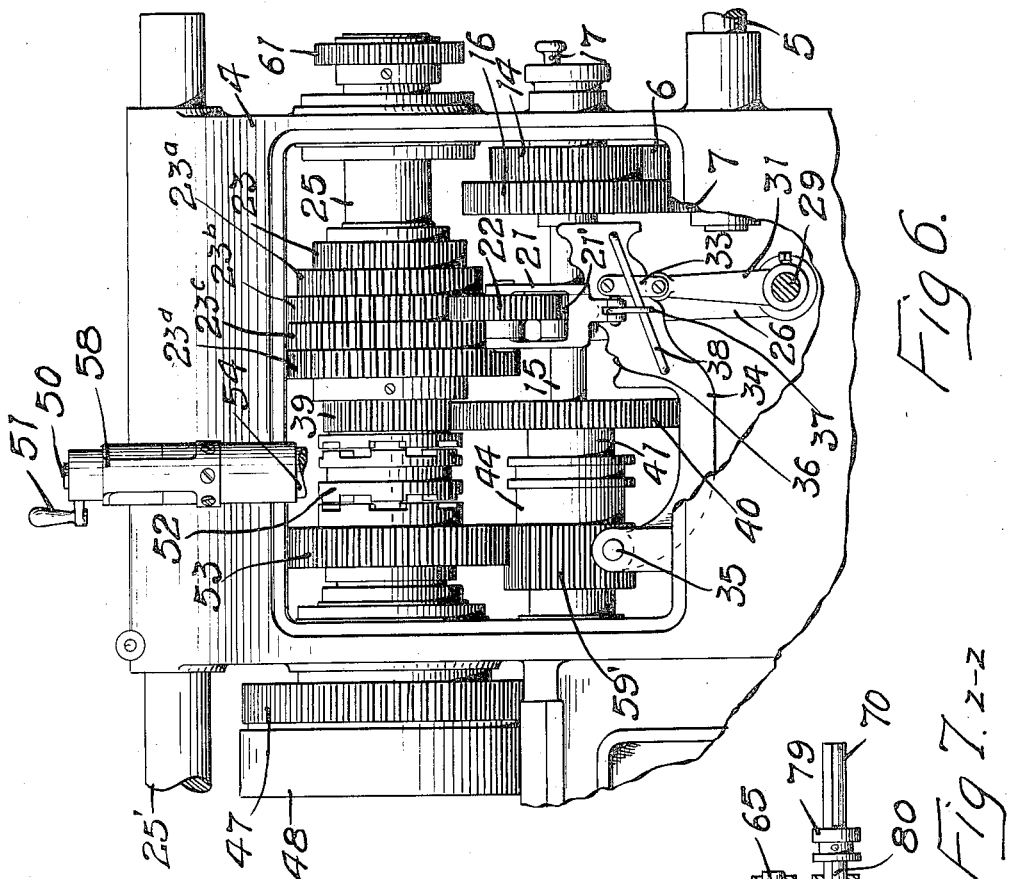
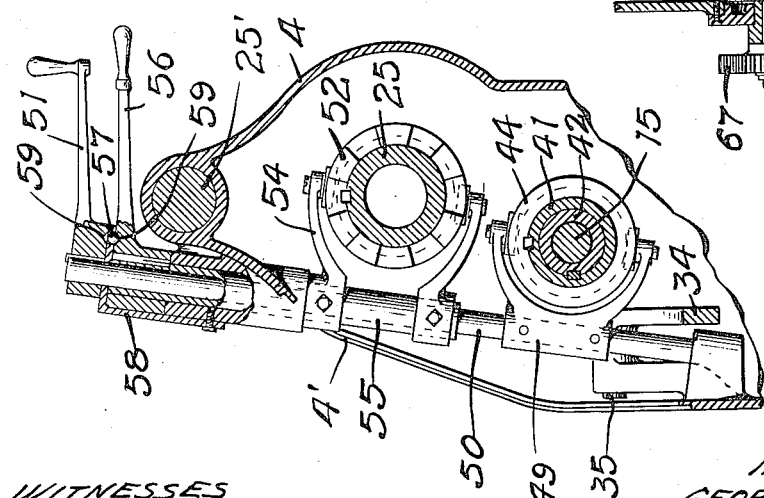
WITNESSES
INVENTOR
GEORGE A. STEINLE
BY Paul Paul
HIS ATTORNEYS

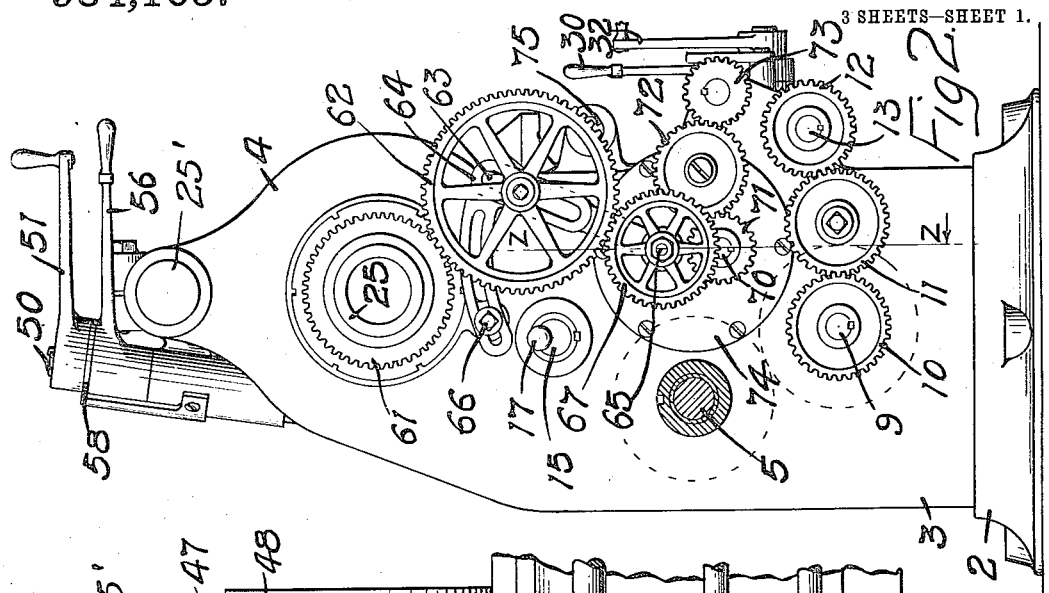

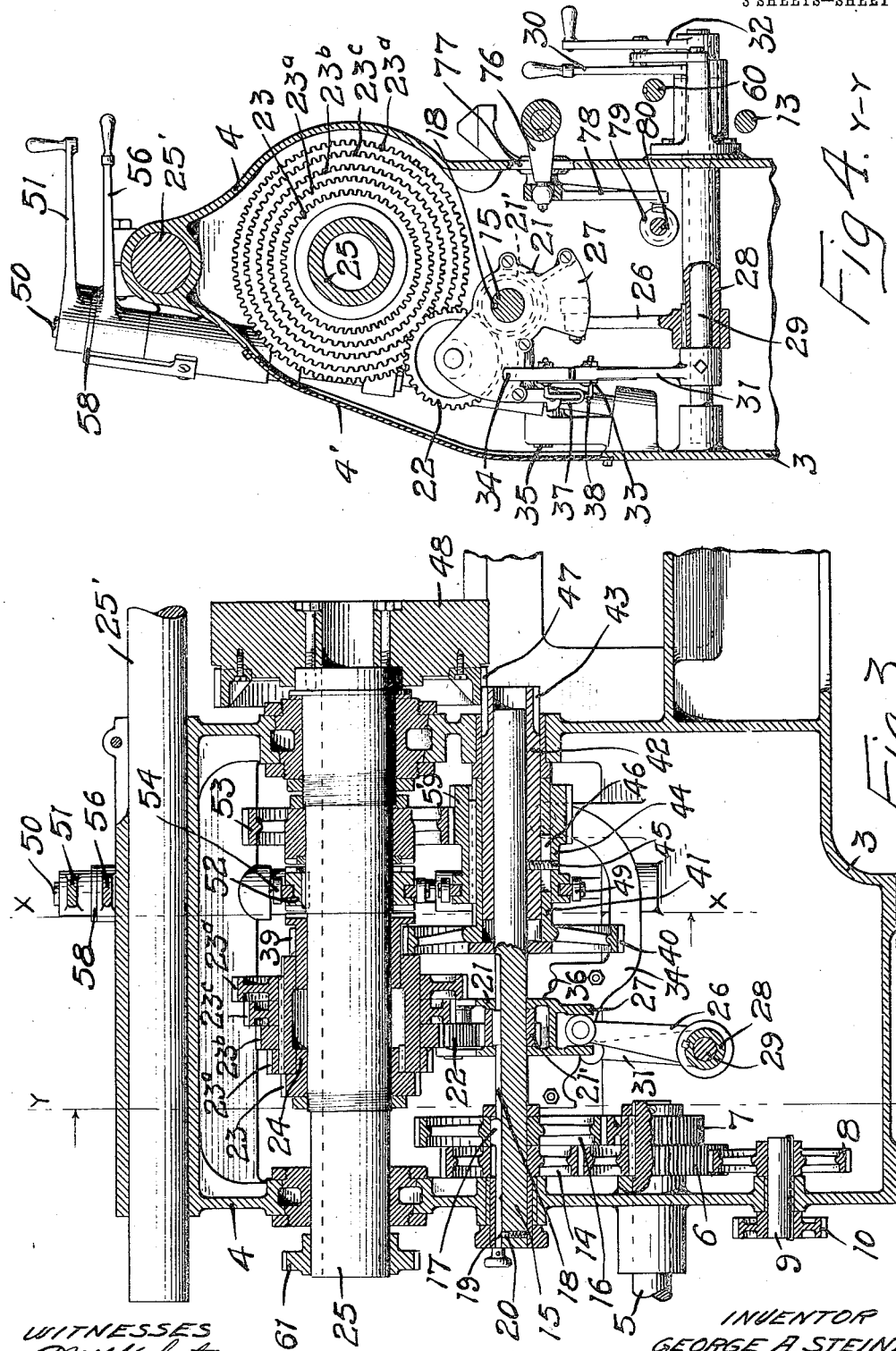

UNITED STATES PATENT OFFICE.

GEORGE A. STEINLE, OF MADISON, WISCONSIN, ASSIGNOR TO STEINLE TURRET MACHINE COMPANY, OF MADISON, WISCONSIN, A CORPORATION OF WISCONSIN.

GEARING.

934,105.  Specification of Letters Patent.  Patented Sept. 14, 1909.

Application filed January 11, 1908. Serial No. 410,367.

*To all whom it may concern:*

Be it known that I, GEORGE A. STEINLE, of Madison, Dane county, Wisconsin, have invented certain new and useful Improvements in Gearing, of which the following is a specification.

My invention relates to the turret type of lathe and the object of the invention is to provide a lathe frame of extremely stiff and rigid construction and very compact in form.

A further object is to provide a lathe having a standard and housing formed thereon, said housing inclosing the speed controlling mechanism of the lathe chuck and having an opening and a door therefor through which access may be had to the mechanism inclosed within the housing.

A further object is to provide a simple compact mechanism whereby a great variety of different speeds may be obtained for the chuck spindle.

A further object is to provide mechanism whereby the operation of the different speed devices can be quickly and positively controlled.

My invention consists generally in various constructions and combinations, all as hereinafter described and particularly pointed out in the claims.

In the accompanying drawings, forming part of this specification, Figure 1 is a side elevation of one end of a lathe embodying my invention. Fig. 2 is an end view of the same. Fig. 3 is a sectional view. Fig. 4 is a sectional view on the line $y$—$y$ of Fig. 3 looking in the direction of the arrow. Fig. 5 is a sectional view on the line $x$—$x$ of Fig. 3 looking in the direction of the arrow. Fig. 6 is a detail of the opposite side of the machine from the view shown in Fig. 1, with a portion of the wall of the lathe head broken away. Fig. 7 is a detail sectional view of the mechanism for changing the speed of the power feed shaft, taken on line $z$—$z$ of Fig. 2.

In the drawing, 2 represents a base, 3 a standard thereon supporting a housing or casing 4 within which the principal portion of the speed mechanism is arranged, the housing and standard being cast in one piece and constituting the head of the lathe. I have found that by casting these parts in one piece I am able to stiffen the frame of the lathe very materially, and increase the rigidity of portions thereof, which in lathes as usually constructed, are subject to more or less vibration. I am also able to exclude dust and dirt from the operating mechanism and at the same time render it readily accessible through an opening in the wall of the housing that is closed by a plate or cover 4'. This cover may be readily removed to permit access to the interior of the housing.

5 is a driving shaft journaled in the end wall of the lathe head, having a pulley 5' and carrying two gears 6 and 7 of different sizes. The gear 6 meshes with a gear 8 on a shaft 9 within the lathe head, and a gear 10 is mounted on the same shaft outside the said head and through an idle gear 11 drives a gear 12 on a shaft 13 that extends parallel with the lathe frame. This shaft, which I may term the "power mover shaft" has for its function the moving of the carriage at a rapid, constant speed toward or from the work. The gear 6 also meshes with a gear 14 that is loosely mounted on a driven shaft 15 above the driving shaft. The gear 7 meshes with a gear 16 that is larger than the gear 14 and is also loosely mounted on the shaft 15. Both gears 14 and 16 may be locked alternately by means of a key 17 slidable in a way 18 in the shaft 15. This key is provided with notches 19 that are engaged by a spring-pressed pin 20 in the shaft 15 and thus the key is held against premature movement.

Either one or the other of the gears 14 and 16 may be locked on the shaft 15 by the adjustment of the key and the movement of one of the gears 6 and 7 transmitted thereby to the shaft 15. A casing 21 is loosely mounted on the shaft 15 and carries a gear wheel 22 that is adapted to engage one of a series of five gears 23, 23$^a$, 23$^b$, 23$^c$ and 23$^d$, that are carried by a sleeve 24 that is loosely mounted on a chuck spindle 25. The gear 22 is driven from a pinion 21' that is splined on the driven shaft 15 within the casing 21 and operates continuously. The casing 21 is moved back and forth on the shaft 15 by means of an arm 26 having one end fitting within a fork 27 on said casing and keyed on a sleeve 28 that is loosely mounted on a shaft 29 and has an operating lever 30. The end of the arm 26 has an anti-friction bearing within the fork of the casing. When this casing is moved back and forth the gear 22 will be moved horizontally into the planes of the chuck spindle gears to permit the gear 22 to mesh with the different sizes of spindle gears and vary the speed of the spindle.

The casing 21 besides having a longitudinal movement on the shaft 15 has a rotary movement to permit the gear 22 to engage the spindle gears of different sizes. For the purpose of oscillating the said casing and the gear 22 I provide an arm 31 secured on the shaft 29 which is oscillated by a lever 32, said arm 31 having a link connection 33 with a hanger 34 that is pivoted at one end on a stud 35. The other end of the hanger has a series of recesses 36 in its upper edge corresponding to the number of gears on the chuck spindle, and adapted to receive the end of the casing 21 and aid in holding the gear 22 against premature movement. A link 37 connects the casing 21 with a guide rod 38 that is arranged at an incline on the hanger 34. The movement of the casing 21 through the operation of the lever 30 will cause the gear 22 to travel from the plane of one gear on the chuck spindle to the plane of another gear thereon and by means of the lever 32 the attendant can oscillate the shaft 29 and rock the arm 31 and raise or lower the casing 21 and the gear 22 according to the size of the gear on the chuck spindle with which the attendant desires the gear 22 to mesh.

A gear 39 is provided on the sleeve 24 and meshes with a gear 40 that is carried by one end of a sleeve 41 that is mounted on a hub 42 of a pinion 43. A hub 44 has a pin 45 which passes through a slot 46 in the sleeve 41 and prevents rotation of the said sleeve independently of the hub 42 but allows the latter to be moved lengthwise of the shaft 15 independently of the sleeve to bring the pinion 43 into mesh with a gear 47 secured on the lathe chuck 48 or to separate said pinion and gear. Above the chuck spindle is a shaft 25' on which a support or guide for the lathe tool is mounted. This support forms no part of my present invention and is not illustrated herein.

The hub 44 has a loose connection with the arms of a yoke 49 that is secured on a shaft 50 that is arranged in a substantially upright position and is provided with an operating crank 51 on its upper end by means of which the lathe attendant can oscillate the yoke 49 and move the hub 44 back and forth on the sleeve 41 to connect the pinion 43 with the chuck gear or disconnect them. The adjustment of the gear 22 to mesh with the different sized gears on the chuck spindle will permit the chuck to be operated at five different speeds and as there are two gears of different sizes on the driving shaft, it is evident that five different speeds may be obtained through each one, or ten in all through the operation of the crank 51 and the adjustment of the key 17. A clutch 52 is splined on the chuck spindle 25 between the gear 39 and a gear 53, both of said gears being normally idle but temporarily locked on the spindle by the engagement of the clutch therewith. The clutch 52 has arms 54 connecting it with a sleeve 55 loosely mounted on the shaft 50 and having an operating crank 56, by means of which the clutch 52 may be thrown into engagement with either the gear 39 or the gear 53, as indicated in Fig. 5, and to prevent the operation of both of them at the same time I provide a loose ball 57 in a socket provided in a plate 58 extending between the hubs of the cranks. The ball is adapted to enter recesses 59 in the hubs of the cranks 51 and 56. In the position shown in Fig. 6 the lower crank will be locked as the ball rests by gravity in the recess therein. When this crank is oscillated the ball will be raised out of the recess in the hub and will enter the corresponding recess in the hub of the crank 51, being partially in said recess and partially in the socket in the plate, thus preventing this crank from being moved until the crank 56 has been returned to its normal position. The engagement of the clutch 52 with the gear 39 will cause the transmission of power from the driving shaft through the chuck spindle to the chuck and by means of the different sized gears on the spindle and the two gears on the driving shaft the chuck may be operated at ten different speeds. The gear 53 meshes with the gear 59' on the shiftable hub 44 and when the clutch 52 is thrown into engagement with the gear 53 the power will be transmitted through the gears 39 and 40 and the gears 59' and 53 to the spindle and chuck, the pinion being withdrawn from engagement with the chuck gear by the operation of the yoke 49. By this means and the gears of different size on the chuck spindle and the driving shaft the lathe chuck may be operated at ten other speeds, making a total of thirty different speeds at which the lathe chuck may be operated by the simple compact mechanism described. As heretofore stated the shaft 13 is utilized when it is desired to move the carriage rapidly for any purpose toward or from the work, and a shaft 60 is provided near the shaft 13 through which power is supplied for the normal feed of the carriage. I have illustrated in this case the mechanism for operating these shafts but do not claim the same herein.

A gear 61 is secured on the end of the chuck spindle, meshing with an idle gear 62 that is adjustably mounted in a slot 63 of a quadrant-shaped plate 64 that is pivoted on a stub shaft 65 and has an adjustable connection 66 at its opposite end by means of which the plate may be oscillated to move the gear 62 toward or from the gear 61. By means of this adjustable plate I am able to substitute gears of different sizes for the gear 62 and thus vary the speed of the mechanism. A gear 67 is mounted on the stub shaft 65 and a series of gears 68 are secured on the shaft 65 and mesh with the corresponding but oppositely arranged series of gears 69 on a shaft 70, see Fig. 7. A gear 71 is secured on the shaft 70 meshing with the idle gear 72 through which a gear 73 on the shaft 60 is driven. The shafts 65 and 70 are journaled in a plate 74 that is removably mounted on the frame of the machine to permit the said shafts and the plate 64 with the gears carried thereby to be removed from the machine.

This mechanism is designed particularly for screw cutting, and a great variety of speeds may be obtained through the gears 69 and 68 and the gears on the chuck spindle and driven shaft.

A lead screw 75 is mounted on the outside of the machine frame parallel with the shafts 13 and 60 and carries an arm 76 which projects through a slot 77 in the lathe head. The inner end of the arm 76 is connected with a bell crank 78 that is pivoted on the wall of the lathe head and has one arm in engagement with a collar 79 and is adapted to slide in a way in the shaft 70 and lock or release the gears 69 on the shaft 70 as the collar is moved back and forth. The rocking of the shaft 75 is controlled from the lathe carriage.

I claim as my invention:

1. The combination, with a frame, of a driving shaft journaled therein, gears secured on said driving shaft, a driven shaft, gears loosely mounted on said driven shaft, means for temporarily locking either one of said driven shaft gears to the driven shaft, including a sliding key movable in a key seat in the driven shaft and adapted to engage one or the other of the driven shaft gears, a pinion splined on said driven shaft, a spindle, a series of gears of different sizes loosely mounted on said spindle, a casing inclosing said driven shaft pinion and slidable therewith and having an independent oscillating movement, a gear carried by said casing and meshing with said pinion and with either one of said spindle gears and means for adjusting said casing lengthwise of said driven shaft and in a rotary direction with respect thereto to move said casing gear into mesh with said spindle gears.

2. In a lathe, the combination, with a driven shaft, of a pinion splined thereon, a casing inclosing said pinion and adapted to slide therewith and having a rotary movement independent of said pinion, a gear carried by said casing and meshing with said pinion, a spindle, a series of gears of different sizes loosely mounted thereon and adapted to mesh one at a time with the gear on said casing, a pivot bar having a notched edge adapted to engage said casing, a rock shaft having an operating lever, an arm mounted thereon and a link connecting said arm with said bar, said arm and link being adapted to normally lock said bar against movement, whereby said casing and its gear will be held in mesh with the spindle gear, and means for adjusting said casing and gear lengthwise on said driven shaft to move them into the planes of the different spindle gears.

3. The combination, with a driven shaft, of a pinion splined thereon, a casing inclosing said pinion and slidable therewith and having a rotary movement independent thereof, a gear carried by said casing, a spindle, a series of gears of different sizes mounted on said spindle and adapted to engage one at a time with said casing gear, a bar pivoted at one end and having a series of notches in its edge adapted to receive said casing, said notches corresponding in number to the number of gears on said spindle, means for locking said bar against premature movement and imparting an oscillating movement to said casing, and means for moving said pinion and casing lengthwise on said driven shaft.

4. The combination, with a driven shaft, of a pinion splined thereon, a casing 21 inclosing said pinion, a gear 22 carried by said casing and meshing with said pinion, a spindle, a series of gears of different sizes mounted thereon, said casing 21 having a sliding movement on said driven shaft and a rotary movement with respect thereto, a pivoted bar, a rod arranged at an incline thereon, a link slidable on said rod and pivotally connected to said casing, and means for oscillating said bar to adjust said gear 22 to mesh with spindle gears of different sizes.

5. The combination, with a driven shaft, of a pinion splined thereon, a casing loosely mounted on said shaft and inclosing said pinion, a gear carried by said casing and meshing with said pinion, a spindle, a series of gears of different sizes mounted thereon and adapted to mesh one at a time with said casing gear, a rock shaft, an arm secured thereon, means connecting said arm with said casing whereby the rocking of said shaft will oscillate said casing to adjust its gear to the different sizes of spindle gears, a sleeve inclosing said rock shaft, an arm secured thereon and having a loose connection with said casing, whereby the rotation of said sleeve will move said casing and pinion on said driven shaft, and operating levers secured on said rock shaft and sleeve.

6. The combination, with a spindle, of a series of gears of different sizes loosely mounted on said spindle, a driven shaft, means for driving said spindle gears one at a time from said driven shaft, a gear 39 loosely mounted on said spindle, a locking clutch therefor, a hub slidably mounted on said driven shaft and having a pinion, a gear

40 arranged to mesh with said gear 39 and be driven thereby, and means for transmitting the movement of said gear 40 to said hub and its pinion.

7. The combination, with a spindle, of a sleeve loosely mounted on said spindle, a series of gears of different sizes mounted on said sleeve, a driven shaft, a driven connection between said driven shaft and said spindle gears, a gear 39 secured on said sleeve, a clutch provided on said spindle and arranged to engage and lock said gear 39, a hub arranged to slide on said driven shaft and having a pinion, a gear 40 meshing with said gear 39 and having a sleeve 41 inclosing said hub, a second hub mounted on said sleeve 41 and having a pin connection with said first named hub through a slot in said sleeve, whereby the power from said driven shaft may be applied through said gears 39 and 40 and said first named hub to said hub pinion or through said spindle and said spindle clutch.

8. The combination, with a spindle, of a sleeve loosely mounted on said spindle, a series of spindle gears of different sizes secured on said sleeve, a driven shaft, a driving connection between said driven shaft and said gears, a gear 39 secured on said sleeve, a gear 53 loosely mounted on said spindle, a clutch interposed between said gears 39 and 53 on said spindle and adapted to lock either one of them thereon, a gear 40 meshing with said gear 39 and having a sleeve inclosing said driven shaft, a hub gear 59' mounted on said sleeve to revolve therewith and meshing with said gear 53 whereby power from either one of said spindle gears may be transmitted through said gears 39, 40, 59' and 53 to said spindle.

9. The combination, with a housing, of a driving shaft journaled therein, a driven shaft having a driving connection with said driving shaft, a spindle, a gear 47 fixed to said spindle, a series of gears of different diameter loosely mounted on said spindle and having a driving connection with said driven shaft, gears 39 and 53 loosely mounted on said spindle, said gears 39 being connected with said spindle gears, a clutch splined on said spindle between said gears 39 and 53 and adapted to alternately lock them on said spindle, a shaft 50 arranged in a substantially upright position and projecting through the top of said housing, a crank secured on said shaft 50, a sleeve mounted on said shaft 50 and also having an operating crank and connected with said spindle clutch to operate the same, said shaft and sleeve cranks being located above one another and overhanging said housing, a gear 40 meshing with said gear 39 and loosely mounted on said driven shaft, a hub 44 having a revolving movement with said sleeve and a gear 43 adapted to engage or disengage the spindle gear 47 and a gear 59 meshing with said gear 53 and said last named having an operative connection with said shaft 50, whereby the movement of said shaft and lever cranks will control the application of power through the clutch to the spindle or through the driven shaft and the clutch to the spindle or through the driven shaft to the gear fixed on the spindle.

In witness whereof, I have hereunto set my hand this 31st day of December 1907.

GEORGE A. STEINLE.

Witnesses:
G. S. MARTIN,
WM. R. BAGLEY.